INVENTOR.
HANS TILLER

Oct. 2, 1956 H. TILLER 2,764,912
PHOTOGRAPHIC OBJECTIVE COMPRISING FRONT AND REAR
LENS SYSTEMS AXIALLY SPACED AT A FIXED DISTANCE
Filed Sept. 28, 1951 3 Sheets-Sheet 2

INVENTOR.
HANS TILLER
BY

Oct. 2, 1956   H. TILLER   2,764,912
PHOTOGRAPHIC OBJECTIVE COMPRISING FRONT AND REAR
LENS SYSTEMS AXIALLY SPACED AT A FIXED DISTANCE
Filed Sept. 28, 1951   3 Sheets-Sheet 3

INVENTOR.
HANS TILLER
BY
Leon M. Strauss
AGT.

United States Patent Office 2,764,912
Patented Oct. 2, 1956

2,764,912

PHOTOGRAPHIC OBJECTIVE COMPRISING FRONT AND REAR LENS SYSTEMS AXIALLY SPACED AT A FIXED DISTANCE

Hans Tiller, Zurich, Switzerland, assignor to Cycloptic Anstalt für Optik und Mechanik, Vaduz, Liechtenstein Application September 28, 1951, Serial No. 248,741

5 Claims. (Cl. 88—57)

This application is a continuation in part of the application Ser. No. 9,709 of February 20, 1948, now abandoned.

It has been endeavored to raise the efficiency of photographic objectives by improving the image brightness and quality. Bounds are set to such improvements, in that the enlargement of the objective aperture cannot be raised at will because of the increasing marginal reflections and illumination losses. When the objective aperture increases, the defects of the optical system increase and the correction thereof becomes increasingly difficult. Such disadvantages are caused above all by the following facts: first, the amount of the principal rays and the appurtenant pencils of rays absorbed in the optical system by the lens mountings increases as the angle of incidence of the principal rays increases and therefore do not pass the objective and do not reach the image plane. Second, with increasing incidence angles the pencils of rays passing the objective strike the lens surface under larger and therefore more unfavorable angles of incidence. Third, the pencils of rays leaving the objectives are diverging more and more and strike the image plane in an increasing asymmetrical rate with respect to their principal rays.

It is an object of this invention to provide a photographic objective, an objective for television-cameras and the like, having a good condition for corrections, a large relative aperture and a uniform brightness over the whole image field.

The objective according to the present invention consists of an integral, optical unit comprising a front lens, a rear lens-system located at an unchangeable, fixed distance from the front lens and the focal length of the rear lens-system being equal to the total focal length of the whole objective.

In the objective according to this invention, the first lens, which is on the object side, determines the aperture of the whole objective, and the rear system, which is on the image side, determines the focal length of the whole objective.

Similar arrangements are already known and used for instance in the field of measuring instruments, especially for tool microscopes and workshop projectors. For photographic objectives however, objective arrangements according to this invention are new and have several advantages, which have not been recognised yet.

An objective of already known design is shown and embodiments according to this invention are illustrated as examples of this invention in the accompanying drawings, in which Fig. 1 shows schematically the course of rays in an objective as already known in the art.

Figure 1:
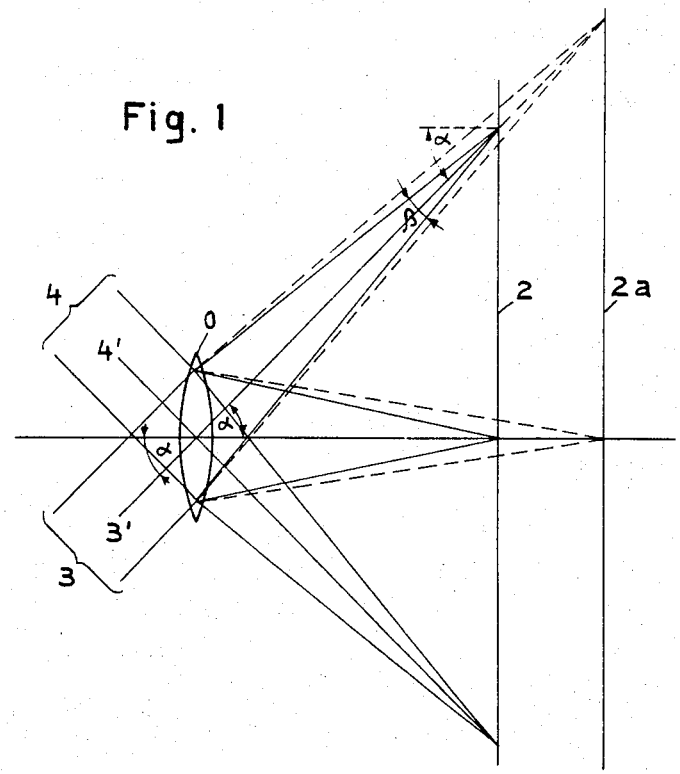

According to Fig. 1 the objective O of known design produces a real image on the image plane 2. The two pencils of rays 3 and 4 and their principal rays 3' and 4' fall in converging relation upon the objective O and leave it in diverging relation. With increasing divergence of the emerging pencils of rays the angle of aperture $\beta$ thereof decreases at the rate of the smaller incidence aperture. Therefore towards the margin of the image, the brightness is decreased compared to the brightness in the center of the image. Besides, towards the margin of the image, the pencils of rays strike the image plane under a large angle of incidence $\alpha$, so that in photographic exposures the emulsion layer is less blackened at the margin than it is in the center portion of the image.

It further has to be borne in mind, that in the example shown the image plane 2 corresponds to an object situated at infinite distance as indicated by the parallelism of the entering rays. If an image has to be formed of an object situated at finite distance, for instance quite close to the objective, the distance between the objective and the image plane has to be varied, that is, it has to be increased. The respective image plane 2a is therefore situated to the right of the image plane 2, that is further away from the objective. Since the size of an image of an objective being installed in a camera, is the same for all distances of the object, a part of the pencils of rays strike the image plane outside of the image area. These pencils of rays are lost and do not add to the formation of the image. The given image area on the image plane therefore receives less light and there is a loss of illumination in the image area. In other words, the pictures of nearby objects are less bright than those of remote objects and the field angle is smaller for close exposures than it is for distant exposures.

Figure 2:
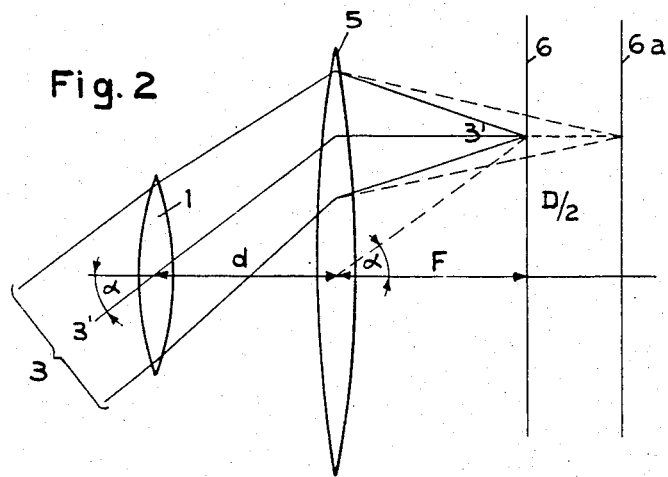
Fig. 2 shows the course of rays in an objective according to this invention.

Fig. 2 schematically shows a photographic objective according to the invention. The objective consists in optical respect, that is with respect to the conditions and the construction of the system, of an integral unit comprising two parts, the parts being a lens 1 arranged on the object side which is represented as a single positive lens but which may also comprise several lenses and a lens system 5 on the image side, which in this figure is represented by a single positive lens, but which may comprise several lenses. The two parts, that is the lens 1 and the system 5 are separated by a fixed, unchangeable distance $d$ from each other and form in combination an integral unit. For the purpose of focusing, the distance of this unit, that is of the two parts taken as a whole from the image plane, may be varied.

The pencils of rays 3 with the principal ray 3' passing through the lens 1 on the object side fall upon the lens system 5 and are deflected towards the optical axis from their diverging direction. In the case shown in Fig. 2 the deflection is such, that the principal rays 3' after leaving the lens system 5 are exactly parallel to the optical axis of the whole objective and therefore strike the image plane at a right angle. This ray path is called telecentric ray path on the image side. The principal rays 3' entering the first partial system 1 under an angle are leaving the second partial system 5 in parallel relation to the optical axis only under certain given conditions. The conditions are fullfilled, if the rear principal plane of the partial system 1, which is the plane on the side of the sub-system 5 goes through the front focal point of the partial system 5 which is on the side of the sub-system 1. In other words, the distance $d$ has to be equal to the focal length $f_5$ of the partial system 5.

The focal length F of an optical system being composed of two systems with the focal lengths $f_1$ and $f_5$ leaving the distance $d$ is given by the well known formula $$F = \frac{f_1 \cdot f_5}{f_1 + f_5 - d}$$

If, as stated above, it is assumed that $d = f_5$, it follows $$F = f_5$$

that is, the focal length of the whole objective is equal to that of the partial system 5 and the first partial system has no influence on the focal length of the whole objective.

Through the first partial system 1 there is determined mainly the relative aperture of the objective, for the lenses of the system 5 have such a large diameter that all pencils of rays entering the system may pass without any restriction.

If the distance $d$ is not exactly equal to $f_5$, the principal rays 3' do not leave in exactly parallel relation to the axis of the system and are somehow divergent or convergent with respect to the optical axis. Examinations have shown, that small deviations from the equation $d = f_5 = F$ are practically not significant as long as the deviation is not more than 20%.

The direction of the principal rays 3' striking the image plane 6 determines the size of the picture in the image plane.

As stated above, the lenses of the system 5 determine in principle the focal length of the whole objective. If the principal rays leave the sub-systems 5 parallel to the optical axis, the total focal length is given only by the second sub-system 5. The more the principal rays deviate from the parallel relation to the optical axis, that is the more the front focal point of the sub-system 5 moves away from the rear principal plane of the partial system 1, the more increases the contribution of the first sub-system 1 to the total focal length.

In the example shown in Fig. 2 the principal rays of all pencils of rays strike the image plane at right angles and the marginal rays of the pencils of rays form like angles of incidence with the principal rays when hitting the image plane. This means that the brightness of all the image points on the entire image plane, excluding reflexion losses, is substantially identical. There is no substantial decrease of the brightness towards the marginal portions, because it is well known that the brightness of the image for a diverging ray path is proportional to $\cos \alpha \cos^3 \alpha'$. As the angle of emergence is $\alpha' = 0$ for a parallel ray path, the decrease of the brightness is proportional to $\cos \alpha$ only, that is the brightness is diminished only by the amount of the cross section of the pencils at the place of the striking into the sub-system 1.

The position of the image plane 6 corresponds to an object at infinite distance. For an exposure of a nearby object the image plane 6a is to the right of the plane 6, that is further away from the objective. Also in this case the principal rays strike the image plane 6a at right angles, the image has the same size, so that no rays are lost for the formation of the image. The brightness of the image thus remains the same for close as well as for distant view exposures.

As shown by experience the image errors which are inherent to all optical systems are in general easier corrected for pencils of rays striking the image plane symmetrically with respect to the appurtenant principal ray, and are in general corrected with difficulty in the case of beams striking the image plane asymmetrically thereto, as this is the case for instance for the pencils of rays diverging highly with respect to their principal rays as shown in Fig. 1.

In the example of Fig. 2, now, all the pencils of rays run symmetrically to the appurtenant principal ray, and for this reason the various image errors may be corrected with relative ease.

Further the image errors may be more easily eliminated when the principal rays of the pencils strike the individual lens surfaces as far as possible at right angles and also emerge therefrom at right angles. As the sub-system 5 comprises a plurality of series-arranged thin lenses, each of which deflecting the principal rays passing therethrough towards the optical axis, the correction is facilitated if the sub-system 5 is properly designed and the breaking power of the individual lenses is kept small.

As the individual pencils of rays, which occupy the lens aperture of the first sub-system 1 substantially fully, pass through only a part of the aperture of the lenses of the sub-system 5, the conditions for correction are also more easily satisfied.

In photographic exposure work, there is a further advantage of the system according to this invention, that all the pencils of rays act in like degree on the photographic emulsion. The drop in brightness heretofore present in the marginal portions may partly be attributed to the fact, that a part of the rays striking the layer of emulsion askew is reflected more on the surface of the layer. In the present invention however such reflection no longer takes place, since the principal rays strike the emulsion layer at least substantially at right angles.

Further it is a well known fact, that a lens influences the quality of the ray association the less, the closer such lens is situated to the image plane.

The fact that the conditions of corrections are more easily satisfied for the optical lens system according to this invention than for a conventional objective constitutes a technical advance.

Figure 10:
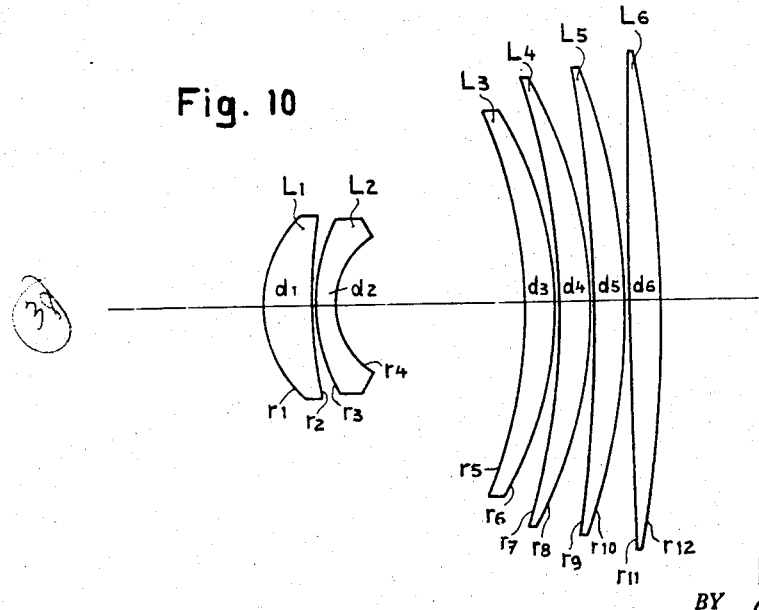
Fig. 10 shows a second example of the objective.
Figure 5:
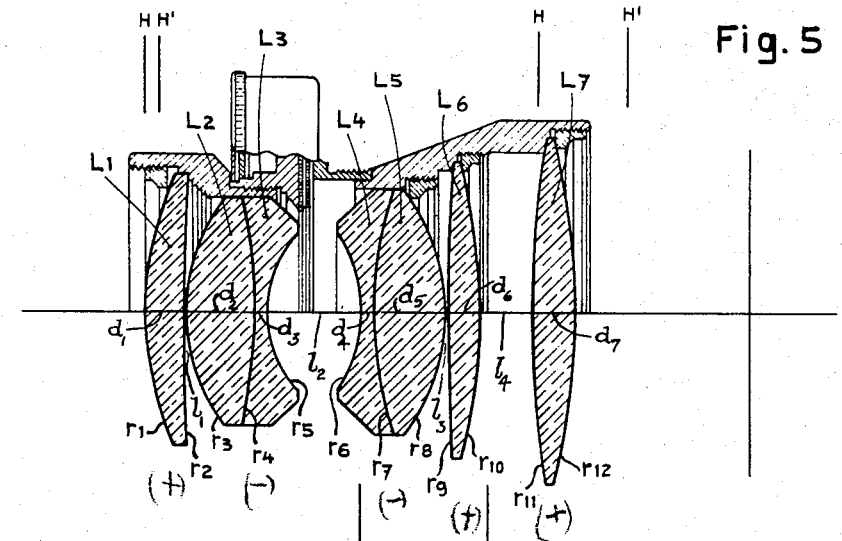
Fig. 5 shows the construction of an objective according to this invention.

The subsystem 1 on the object side may comprise a positive lens, as shown in Fig. 5, but it may also comprise two lenses, a positive and a negative lens, as shown in Fig. 10. If the focal length of the combination of the two lenses is negative, image-distances may be produced, which are greater than the focal length of the objective. This may be required for reflex-cameras for instance.

The sub-system 5 may comprise for example a number of lenses arranged one after another which are slightly curved, each of which deflecting the pencils of rays for a small amount only in the desired direction, such that the whole system 5 enables a substantially smooth deflection of the individual rays.

Figure 3:
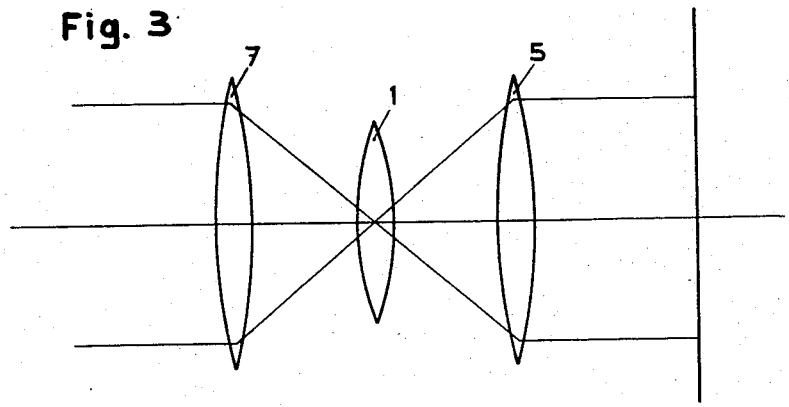
Figs. 3 and 4 show examples of applications.
Figure 4:
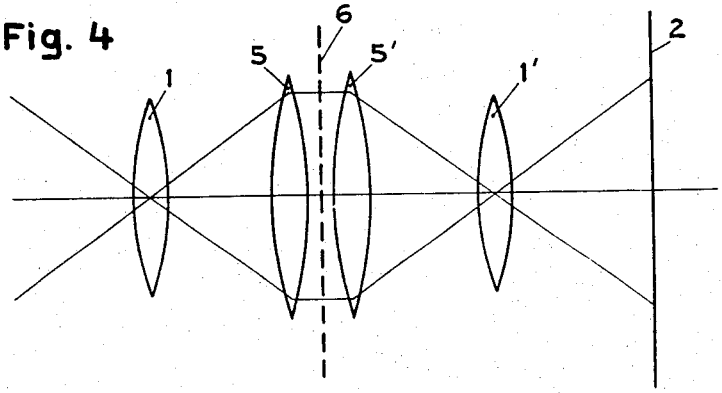

The Figs. 3 and 4 illustrate examples of the application of the objective according to the present invention.

Fig. 3 shows an arrangement, according to which an optical system 7 is placed in front of an objective according to this invention. The system 7 directs converging principal rays to the first sub-system 1. Such an arrangement may be used for instance for making copies of films or for forming other pictures. In the example shown the representation is in the scale 1:1. For such use the brightness over the whole image area is substantially uniform.

Fig. 4 shows an example in which the objective of Fig. 2 is used in a twin arrangement, the principal rays entering the sub-system 1 being parallelized by the sub-system 5 and a real picture being formed in the plane 6. In this plane 6 a scale of any type or a graticule or raster may be disposed, the image of which is projected, together with the image produced in the plane 6 onto the plane 2 by means of the part 5' and the system 1'. The image of the object is reproduced in the plane 2 in the upright position.

In Figs. 5–9 there is shown an example of the objective according to this invention and its condition of correction with respect to sphere, astigmatism, distortion, coma and shadowing is illustrated.

The optical values as the radii $r$, thicknesses $d$, distances 1, the refraction index $n_D$ and the Abbe index $\nu$ are as follows in the example according to Fig. 5:

($\phi$ are the diameters of the lenses)

| | | | $n_D$ | $\nu$ |
|---|---|---|---|---|
| Lens $L_1$ | $r_1 = +31.22$ | $d_1 = 3.75$ | 1.6584 | 50.8 |
| | $r_2 = +245.66$ | $l_1 = 0.25$ | | |
| Lens $L_2$ | $r_3 = +18.875$ | $d_2 = 6.25$ | 1.6204 | 60.3 |
| Lens $L_3$ | $r_4 = -50.97$ | $d_3 = 2.00$ | 1.6057 | 37.9 |
| | $r_5 = +11.875$ | $l_2 = 8.75$ | | |
| | $r_6 = -13.492$ | | | |
| Lens $L_4$ | $r_7 = +42.48$ | $d_4 = 1.75$ | 1.5955 | 39.2 |
| Lens $L_5$ | $r_8 = -19.241$ | $d_5 = 6.75$ | 1.6204 | 60.3 |
| | $r_9 = +245.66$ | $l_3 = 0.25$ | | |
| Lens $L_6$ | $r_{10} = -53.59$ | $d_6 = 3.25$ | 1.6584 | 50.8 |
| | $r_{11} = +120.68$ | $l_4 = 5.00$ | | |
| Lens $L_7$ | $r_{12} = -67.52$ | $d_7 = 4.25$ | 1.6584 | 50.8 |

The first subsystem comprises the first positive lens that is the first lens on the left hand side, the second subsystem is composed of the remaining six lenses, which are partly cemented together.

The focal length of the first sub-system is $f_1 = 54.0$.
The focal length of the second sub-system is $f_5 = 42.0$.
The focal length of the whole system is $F = 38.58$.

The position of the principal planes H and H′ of the sub-systems are shown in the upper part of Fig. 5, the positions of the principal planes H and H′ of the whole system are shown in the lower part of Fig. 5. The focal length of the second sub-system differs therefore by only 9% from the focal length of the total objective and the principal rays are substantially parallel on the image side.

Figure 6:
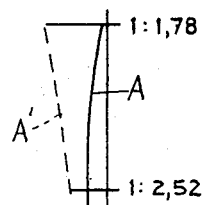
Fig. 6 shows the spherical deviations of the example of Fig. 5.

In Fig. 6 the spherical deviation is shown by the full line A and the deviation from the sinus-condition is shown by the dashed line A′ as a function of the relative apertures which vary from the value 1:1.78 by very small values.

Figure 7:
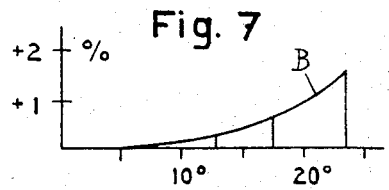
Fig. 7 shows the distortions.

In Fig. 7 there is shown a curve B correlating the field angle laid off on the abscissa and the distortion in percent laid off on the ordinate.

Figure 8:
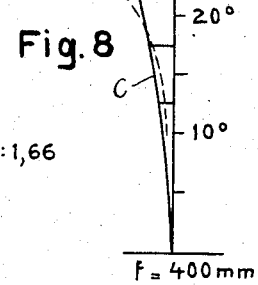
Fig. 8 shows the astigmatical defects.

Fig. 8 illustrates the astigmatism curve C as a function of the field angle between 0° and 25°.

Figure 9:
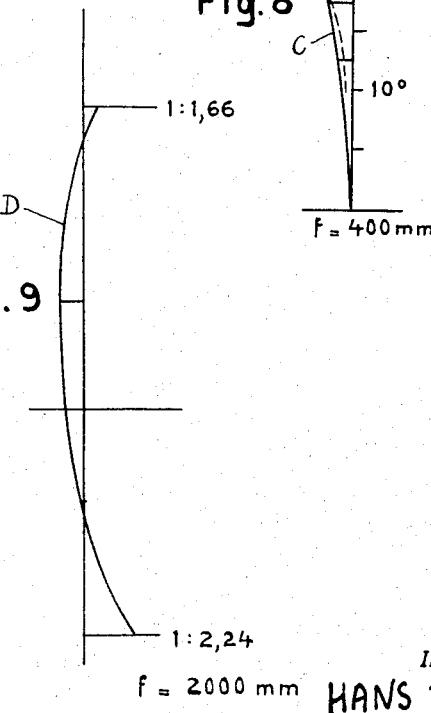
Fig. 9 shows the comatical defects and the shadowing.

Fig. 9 shows coma and shadowing on the abscissa as a function of the relative aperture between the values 1:1.66 and 1:2.24 of the latter, the resulting curve being designated by the reference character D.

In Fig. 10 another embodiment of this invention is shown as an example. The front lens consists of a positive and a negative lens and the rear part comprises four lenses. The optical data of the illustrated objective are:

[Focal length $F = 1.0224$. Image distance $s' = 0.4639$. Maximum of the relative aperture 1 : 2.8.]

| | | | $n_D$ | $\nu$ | $\phi$ |
|---|---|---|---|---|---|
| Lens $L_1$ | $r_1 = +0.2441$ | $d_1 = 0.095$ | 1.6204 | 60.3 | 0.36 |
| | $r_2 = +0.9755$ | $l_1 = 0.01$ | | | |
| Lens $L_2$ | $r_3 = +0.3588$ | $d_2 = 0.04$ | 1.5955 | 39.2 | 0.35 |
| | $r_4 = +0.1543$ | $l_2 = 0.37$ | | | |
| Lens $L_3$ | $r_5 = -0.9463$ | $d_3 = 0.06$ | 1.6031 | 60.7 | 0.76 |
| | $r_6 = -0.7283$ | $l_3 = 0.01$ | | | |
| Lens $L_4$ | $r_7 = -1.4381$ | $d_4 = 0.06$ | 1.6031 | 60.7 | 0.88 |
| | $r_8 = -0.9010$ | $l_4 = 0.01$ | | | |
| Lens $L_5$ | $r_9 = -2.9842$ | $d_5 = 0.06$ | 1.6031 | 60.7 | 0.92 |
| | $r_{10} = -1.3340$ | $l_5 = 0.01$ | | | |
| Lens $L_6$ | $r_{11} = +37.397$ | $d_6 = 0.06$ | 1.6031 | 60.7 | 0.98 |
| | $r_{12} = -2.5967$ | | | | |

The advantages of the optical system according to this invention may be recapituated as follows:

There is no loss or no substantial loss of brightness in the rear sub-system and therefore in the whole system, caused by the shadowing because all pencils of rays pass unhindered and the principal rays are deflected towards the optical axis and also because the angle of incidence of the principal rays on the image plane is a right angle or substantially a right angle. When the pencils of rays strike the emulsion layer the reflection losses are small, because the principal rays are deflected and thus strike the layer at right angles.

For an exact parallel ray path of the principal rays between the objective and the image plane, the image area has exactly the same size and therefore the brightness of the pictures is the same for all distances between camera and objective. For a substantially parallel ray path of the principal rays there can be a small decrease of the brightness towards the marginal area. Because the principal rays strike the photographic layer a right angle or substantially a right angle, there is a uniform formation of the image over the whole image area and the blackened points are almost circularly shaped.

As it can be seen from Figs. 2 and 5, the diameter $\phi$ of the last lens is at least as large as the diameter D of the image. The diameter is given by $D/2 = F \cdot \tan \alpha$, where $\alpha$ is half the field angle. If the last lenses of the rear system have the diameter $D = 2 \cdot F \cdot \tan \alpha$, all principal rays 3′ entering the rear system 5 pass the second system unhindered without being influenced by the lens holders. All lenses or at least the last lenses of the rear system may have the same diameter. But in general this is not necessary, because the rays have the largest distance from the optical axis in the last lens.

If the lens diameters are larger than $2 \cdot F \cdot \tan \alpha$ other rays of the pencils of rays besides the principal rays 3′ are passing the system 5 and increase the brightness of the image in the corners. This is the most important advantage of the objective according to this invention. The objectives commonly used until now have never had lenses of such large diameter because this was not necessary for a diverging ray path. The telecentric ray path was never used, because the advantages of the latter have not been recognised and because it was assumed that it would be impossible to correct lenses of such a large diameter sufficiently. This is the reason, why systems as described above have never been calculated and fabricated for photographic and the like purposes.

What I claim is:

1. A photographic objective for taking pictures corrected for spherical, chromatic, comatic and distortional aberrations, consisting of an integral optical unit and comprising a positive front lens system, a rear lens system having a front focal point located at a fixed distance from the rear principal point of the front lens system, said fixed distance between the rear principal point of the front lens system and the front focal point of the rear lens system being substantially equal to the focal length of the rear lens system, said rear lens system including at least two lenses, the focal length of the front lens system being greater than the focal length of the whole objective and less than infinite, the focal length of the rear lens system being at least 80% and not more than 120% of the focal length of the whole objective, the diameters of the lenses of the rear lens system being of such dimensions that principal rays entering the latter are deflected therein to the optical axis and pass therethrough without being hindered by the lens mounting, the diameter of the last lens of the rear lens system being at least $2 \cdot F \cdot \tan \alpha$, wherein F is the focal length of the whole objective and $\alpha$ is half the field angle for which the objective has been corrected.

2. A photographic objective for taking pictures corrected for spherical, chromatic, comatic and distortional aberrations, consisting of an integral optical unit and comprising a negative front lens system, a rear lens system having a front focal point located at a fixed distance from the rear principal point of the front lens system, said fixed distance between the rear principal point of the front lens system and the front focal point of the rear lens system being substantially equal to the focal length of the rear lens system, the rear lens system consisting of at least two lenses, the absolute amount of the focal length of the front lens system being greater than the focal length of the whole objective and less than infinite, the focal length of the rear lens system being at least 80% and not more than 120% of the focal length of the whole objective, the diameters of the lenses of the rear lens system being of such dimensions that all principal rays entering the rear lens system are deflected in the rear lens system to the optical axis and pass therethrough without being hindered by the lens mounting, the diameter of the last lens of the rear lens system being at least $2 \cdot F \cdot \tan \alpha$, wherein F is the focal length of the whole objective and $\alpha$ is half the field angle for which the objective has been corrected.

3. A photographic objective for taking pictures corrected for spherical, chromatic, comatic and distortional aberrations, consisting of an integral optical unit and comprising a front lens system, a rear lens system having a front focal point located at an unchangeable fixed distance from the rear principal point of the front lens system, said fixed distance between the rear principal point of the front lens system and the front focal point of the rear lens system being substantially equal to the focal length of the rear lens system, the rear lens system consisting of at least two lenses, the focal length of the front lens system being greater than the focal length of the whole objective, and less than infinite, the focal length of the rear lens system being at least 80% and not more than 120% of the focal length of the whole objective, the diameters of the lenses of the rear lens system being of such dimensions that all principal rays entering the rear lens system are deflected in the rear lens system to the optical axis and pass therethrough without being hindered by the lens mounting, the diameters of all the lens of the rear lens system being at least $2 \cdot F \cdot \tan \alpha$, wherein F is the focal length of the whole objective and $\alpha$ is half the field angle for which the objective has been corrected.

4. A photographic objective corrected for spherical, chromatic, comatic and distortional aberrations, consisting of an antegral optical unit and comprising a positive front lens, a rear lens system located at an unchangeable distance from the front lens, the rear lens system consisting of six lenses according to the specifications shown in the following table:

[F=38.58]

| Lens | Radius of Curvature r | Thickness d or Airspace l | Refractive Index $n_D$ | Abbe Index |
|---|---|---|---|---|
| $L_1$ | $r_1=+31.22$ | $d_1=3.75$ | 1.6584 | 50.8 |
|  | $r_2=+245.66$ |  |  |  |
|  |  | $l_1=0.25$ |  |  |
| $L_2$ | $r_3=+18.875$ | $d_2=6.25$ | 1.6204 | 60.3 |
|  | $r_4=-50.97$ |  |  |  |
| $L_3$ |  | $d_3=2.00$ | 1.6057 | 37.9 |
|  | $r_5=+11.875$ |  |  |  |
|  |  | $l_2=8.75$ |  |  |
|  | $r_6=-13.492$ |  |  |  |
| $L_4$ |  | $d_4=1.75$ | 1.5955 | 39.2 |
|  | $r_7=+42.48$ |  |  |  |
| $L_5$ |  | $d_5=6.75$ | 1.6204 | 60.3 |
|  | $r_8=-19.241$ |  |  |  |
|  |  | $l_3=0.25$ |  |  |
|  | $r_9=+245.66$ |  |  |  |
| $L_6$ |  | $d_6=3.25$ | 1.6584 | 50.8 |
|  | $r_{10}=-53.59$ |  |  |  |
|  |  | $l_4=5.00$ |  |  |
|  | $r_{11}=+120.68$ |  |  |  |
| $L_7$ |  | $d_7=4.25$ | 1.6584 | 50.8 |
|  | $r_{12}=-67.52$ |  |  |  | where the refractive index $n_D$ is given for the D-line of the spectrum, the radii r, the thickness d and the spaces l are numbered from front to rear in the usual manner and the + and − signs pertain to surfaces which are, respectively, convex and concave toward the incident light.

5. A photographic objective corrected for spherical, chromatic, comatic and distortional aberrations, consisting of an integral optical unit and comprising a front lens system, a rear lens system located at an unchangeable fixed distance from the front lens, the rear lens system consisting of four lenses according to the specification shown in the following table:

[Focal length F=1.0224. Image distance s'=0.4639. Maximum of the relative aperture 1:2.8]

| Lens | Radius of Curvature r | Thickness d or Airspace l | Refraction Index $n_D$ | Abbe Index | $\phi$ |
|---|---|---|---|---|---|
| $L_1$ | $r_1=+0.2441$ | $d_1=0.095$ | 1.6204 | 60.3 | 0.36 |
|  | $r_2=+0.9755$ |  |  |  |  |
|  |  | $l_1=0.01$ |  |  |  |
| $L_2$ | $r_3=+0.3588$ | $d_2=0.04$ | 1.5955 | 39.2 | 0.35 |
|  | $r_4=+0.1543$ |  |  |  |  |
|  |  | $l_2=0.37$ |  |  |  |
| $L_3$ | $r_5=-0.9463$ | $d_3=0.06$ | 1.6031 | 60.7 | 0.76 |
|  | $r_6=-0.7283$ |  |  |  |  |
|  |  | $l_3=0.01$ |  |  |  |
| $L_4$ | $r_7=-1.4381$ | $d_4=0.06$ | 1.6031 | 60.7 | 0.88 |
|  | $r_8=-0.9010$ |  |  |  |  |
|  |  | $l_4=0.01$ |  |  |  |
| $L_5$ | $r_9=-2.9842$ | $d_5=0.06$ | 1.6031 | 60.7 | 0.92 |
|  | $r_{10}=-1.3340$ |  |  |  |  |
|  |  | $l_5=0.01$ |  |  |  |
| $L_6$ | $r_{11}=+37.397$ | $d_6=0.06$ | 1.6031 | 60.7 | 0.98 |
|  | $r_{12}=-2.5967$ |  |  |  |  | where the refractive index $n_D$ is given for the D-line of the spectrum, the radii r, the thickness d and the spaces l are numbered from front to rear in the usual manner and the + and − signs pertain to surfaces which are, respectively, convex and concave toward the incident light.

References Cited in the file of this patent

UNITED STATES PATENTS

| 1,484,853 | Warmisham | Dec. 26, 1924 |
| 1,610,514 | Graf | Dec. 14, 1926 |
| 1,884,994 | Kitroser | Oct. 25, 1932 |
| 1,945,977 | Oswald | Feb. 6, 1934 |
| 2,356,620 | Schade | Aug. 22, 1944 |
| 2,445,594 | Bennett | July 20, 1948 |

FOREIGN PATENTS

| 271,419 | Switzerland | Jan. 16, 1951 |
| 170,592 | Austria | Mar. 10, 1952 |